(12) United States Patent
Ji

(10) Patent No.: US 9,515,839 B2
(45) Date of Patent: Dec. 6, 2016

(54) METHOD AND SYSTEM FOR IMPLEMENTING MOBILE STREAMING MEDIA

(71) Applicant: HUAWEI TECHNOLOGIES CO., LTD., Shenzhen (CN)

(72) Inventor: Jiagang Ji, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 113 days.

(21) Appl. No.: 14/286,047

(22) Filed: May 23, 2014

(65) Prior Publication Data

US 2014/0254467 A1  Sep. 11, 2014

Related U.S. Application Data

(63) Continuation of application No. PCT/CN2011/083071, filed on Nov. 28, 2011.

(51) Int. Cl.
*H04H 20/71* (2008.01)
*H04L 12/18* (2006.01)
(Continued)

(52) U.S. Cl.
CPC ......... *H04L 12/189* (2013.01); *H04L 65/1026* (2013.01); *H04L 65/4076* (2013.01);
(Continued)

(58) Field of Classification Search
USPC ......... 370/312–329, 336–350; 709/203–231, 709/241
See application file for complete search history.

(56) References Cited

U.S. PATENT DOCUMENTS 6,769,028 B1 * 7/2004 Sass .................. H04L 29/12047
348/E7.071
7,613,768 B2 * 11/2009 Harville ............ H04L 29/06027
707/999.01
(Continued)

FOREIGN PATENT DOCUMENTS

CN 101150763 A 3/2008
CN 101790143 A 7/2010
(Continued)

OTHER PUBLICATIONS

PCT International Search Report and Written Opinion; Forms PCT/ISA/210, PCT/ISA/220, and PCT/ISA/237; dated Sep. 6, 2012 in corresponding PCT/CN2011/083071 (10 pages).

*Primary Examiner* — Man Phan
(74) *Attorney, Agent, or Firm* — Staas & Halsey LLP

(57) ABSTRACT

A method and a system for implementing mobile streaming media is provided by: receiving, by a small-cell base station, a request message sent by a terminal, where the request message carries a stream identifier corresponding to a streaming media program, and forwarding the request message to a streaming media source; then establishing, by the small-cell base station, an air interface broadcast physical channel, and mapping the air interface broadcast physical channel to the stream identifier; receiving, by the small-cell base station, a streaming media data packet sent by the streaming media source, and converting the streaming media data packet into a multicast packet; and sending, by the small-cell base station, the multicast packet to the terminal on the air interface broadcast physical channel.

10 Claims, 5 Drawing Sheets

(51) Int. Cl.
*H04L 29/06* (2006.01)
*H04W 76/02* (2009.01)
*H04W 4/06* (2009.01)
*H04W 72/00* (2009.01)

(52) U.S. Cl.
CPC .............. *H04L 65/605* (2013.01); *H04W 4/06* (2013.01); *H04W 76/02* (2013.01); *H04W 72/005* (2013.01)

(56) References Cited

U.S. PATENT DOCUMENTS

| | | | | |
|---|---|---|---|---|
| 7,647,413 B2 * | 1/2010 | Kirkland | ........... | H04L 29/06027 709/203 |
| 8,626,940 B2 * | 1/2014 | Thomas | ........... | H04N 21/44204 709/220 |
| 8,682,968 B2 * | 3/2014 | Gan | ................... | H04L 67/1097 707/711 |
| 8,719,910 B2 * | 5/2014 | Hao | ........................ | H04L 63/10 709/227 |
| 8,787,164 B2 * | 7/2014 | Julia | ................. | G06F 17/30017 370/232 |
| 8,832,287 B2 * | 9/2014 | Yang | ................. | H04L 65/4092 709/229 |
| 2005/0005025 A1 * | 1/2005 | Harville | ............ | H04L 29/06027 709/241 |
| 2008/0216165 A1 | 9/2008 | Kirkland | | |
| 2011/0209184 A1 * | 8/2011 | Gan | .................... | H04L 65/4084 725/92 |
| 2012/0096130 A1 * | 4/2012 | Wei | ........................ | H04L 12/66 709/219 |
| 2013/0254353 A1 * | 9/2013 | Liu | ......................... | H04W 8/00 709/219 |

FOREIGN PATENT DOCUMENTS

CN   102045393 A   5/2011
EP   2487872 A1   8/2012

* cited by examiner

PRIOR ART

METHOD AND SYSTEM FOR IMPLEMENTING MOBILE STREAMING MEDIA

CROSS-REFERENCE TO RELATED APPLICATIONS

This application is a continuation of International Application No. PCT/CN2011/083071, filed on Nov. 28, 2011, which is hereby incorporated by reference in its entirety.

TECHNICAL FIELD

The present invention relates to the field of communications technologies, and in particular, to a method and a system for implementing mobile streaming media.

BACKGROUND

Mobile streaming media refer to a technology or an application of receiving streaming media programs during movement. As a type of brand new mass media, mobile streaming media plays and receives programs using a method of transmitting a wireless digital signal and receiving it by a terrestrial digital device, and the streaming media programs can be watched in a fast-moving state by using terminals such as mobile phones, streaming media systems installed on means of transport like buses, taxis, or subways, mobile multimedia players, and personal computers.

In a currently existing mobile streaming media solution, broadcasting is always performed on a macro network side. As shown in FIG. 1, because a macro network covers a larger area and bears many users, too many communication resources are occupied, and as a result, most users have to watch a same program.

SUMMARY

Embodiments of the present invention provide a method and a system for implementing mobile streaming media, which can provide more personalized mobile streaming media service for users.

In order to achieve the foregoing objective, the embodiments of the present invention provide the following technical solution.

A method for implementing mobile streaming media is provided, including:

receiving, by a small-cell base station, a request message sent by a terminal, where the request message carries a stream identifier corresponding to a streaming media program, and forwarding the request message to a streaming media source;

establishing, by the small-cell base station, an air interface broadcast physical channel, and mapping the air interface broadcast physical channel to the stream identifier;

receiving, by the small-cell base station, a streaming media data packet sent by the streaming media source, and converting the streaming media data packet into a multicast packet; and sending, by the small-cell base station, the multicast packet to the terminal on the air interface broadcast physical channel.

An embodiment of the present invention further provides a system for implementing mobile streaming media, including a small-cell base station and a streaming media source, where:

the streaming media source is configured to send a streaming media data packet to the small-cell base station; and the small-cell base station is configured to receive a request message sent by a terminal, where the request message carries a stream identifier corresponding to a streaming media program, and forward the request message to the streaming media source; establish an air interface broadcast physical channel, and map the air interface broadcast physical channel to the stream identifier; receive the streaming media data packet sent by the streaming media source, and convert the streaming media data packet into a multicast packet; and send the multicast packet to the terminal on the air interface broadcast physical channel.

An embodiment of the present invention further provides a small-cell base station, including:

a first receiving unit, configured to receive a request message sent by a terminal, where the request message carries a stream identifier corresponding to a streaming media program;

a first sending unit, configured to forward the request message sent by the terminal to a streaming media source;

a channel establishing and mapping unit, configured to establish an air interface broadcast physical channel, and map the air interface broadcast physical channel to the stream identifier;

a second receiving unit, configured to receive a streaming media data packet sent by the streaming media source;

a data processing unit, configured to convert the streaming media data packet into a multicast packet; and a second sending unit, configured to send the multicast packet to the terminal on the air interface broadcast physical channel.

It can be found by comparison that, a main difference between the technical solution provided by the embodiments of the present invention and the prior art lies in that, a small-cell base station receives a request message sent by a terminal, where the request message carries a stream identifier corresponding to a streaming media program, and forwards the request message to a streaming media source, then the small-cell base station establishes an air interface broadcast physical channel, and maps the air interface broadcast physical channel to the stream identifier; the small-cell base station receives a streaming media data packet sent by the streaming media source, and converts the streaming media data packet into a multicast packet; and the small-cell base station sends the multicast packet to the terminal on the air interface broadcast physical channel.

Compared with the prior art, the technical solution provided by embodiments of the present invention saves communication resources, and can provide more personalized service for users.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make persons skilled in the art understand the technical solutions in the present invention better, the following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Terms "system" and "network" in this specification are usually used interchangeably. The term "and/or" in the specification describes only an association relationship for describing associated objects and represents that three relationships may exist. For example, A and/or B may represent the following three cases: Only A exists, both A and B exist, and only B exists. In addition, the character "/" in the specification generally indicates an "or" relationship between the associated objects.

In a current mobile streaming media solution, broadcasting is always performed on a macro network side. Because a macro network covers a larger area and bears many users, too many communication resources are occupied, and as a result, most users watch a same program.

In view of the foregoing defect, a first embodiment of the present invention provides a method for implementing mobile streaming media, and the method mainly include the following.

A method for implementing mobile streaming media, including:

receiving, by a small-cell base station, a request message sent by a terminal, where the request message carries a stream identifier corresponding to a streaming media program, and forwarding the request message to a streaming media source;

establishing, by the small-cell base station, an air interface broadcast physical channel, and mapping the air interface broadcast physical channel to the stream identifier;

receiving, by the small-cell base station, a streaming media data packet sent by the streaming media source, and converting the streaming media data packet into a multicast packet; and sending, by the small-cell base station, the multicast packet to the terminal on the air interface broadcast physical channel.

The present invention is further described hereinafter with reference to the accompany drawings and specific implementation manners.

Figure 1:
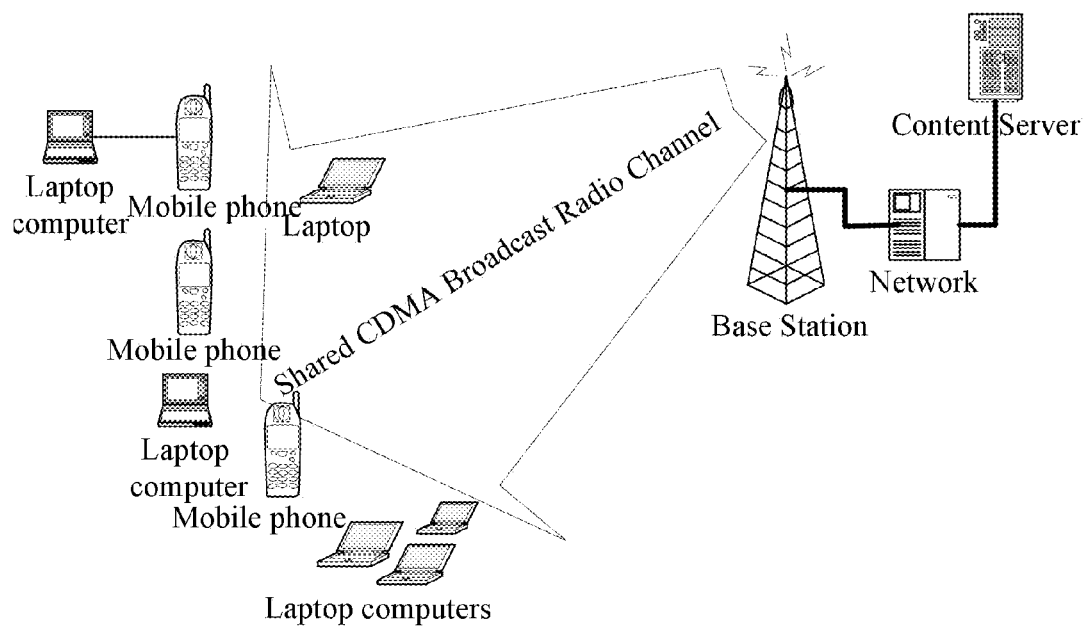
FIG. 1 is a method of broadcasting a streaming media service by using a macro cell in the prior art.
Figure 2:
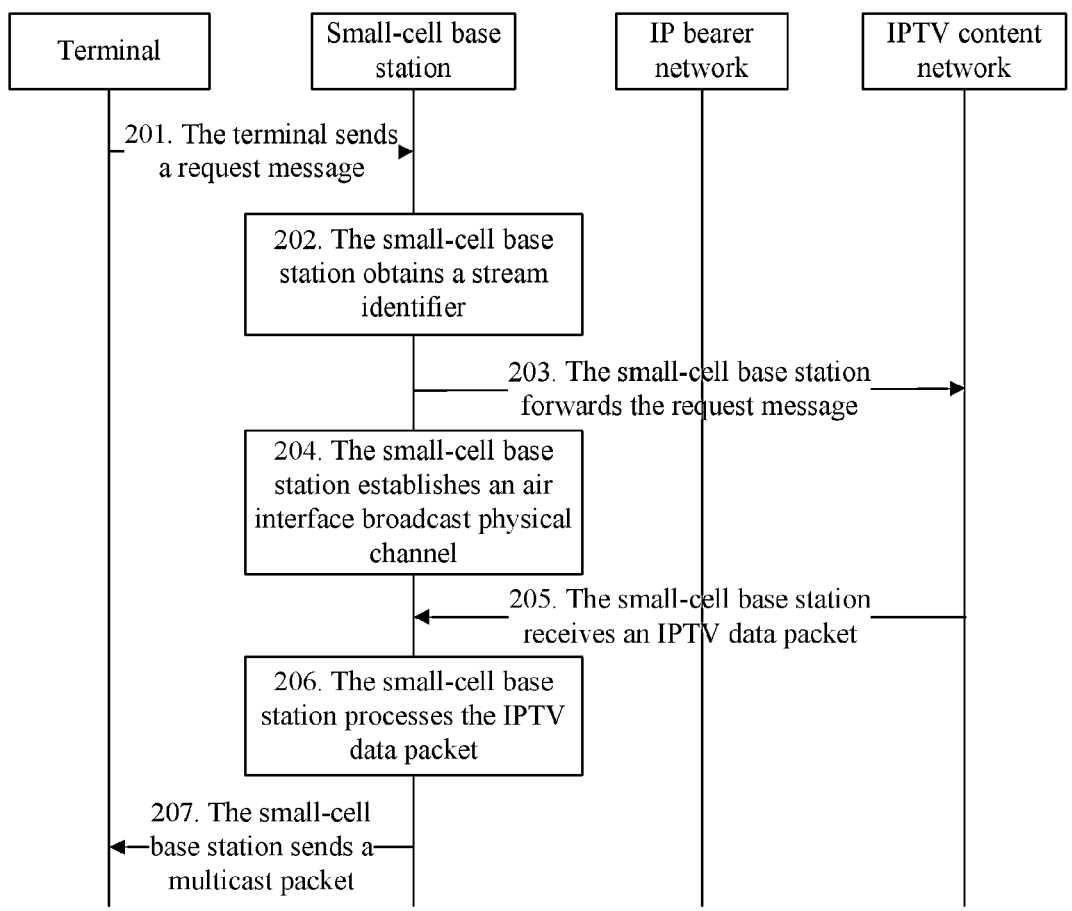
FIG. 2 is a flowchart of a method for implementing mobile streaming media according to an embodiment of the present invention.

As shown in FIG. 2, a second embodiment provides a method for implementing mobile streaming media, and the method mainly includes the following:

Step 201: A small-cell base station receives a request message sent by a terminal, where the request message carries a stream identifier corresponding to an IPTV (Internet Protocol television) program that the terminal wants to watch.

The small-cell base station, also referred to as a femtocell, a palm base station, a home base station, a SOHO base station, or the like. It is a transmitting apparatus with very low power, and is generally designed to be used in homes or small- and medium-sized businesses. For a user who has installed a home broadband network (such as digital subscriber line XDSL, wired cable or optical fiber), the small-cell base station can enable a terminal such as a mobile phone, a personal computer PC, and a tablet computer to be connected to a network of an operator or the Internet by using the broadband network in a range of 20 to 30 meters, to provide wireless voice, image, and various broadband services for the user. It further has functions of automatic configuration and optimization, which does not need extra planning of the operating business or user, does not need user intervention or installation, and does not have technical issues such as site location selection. The small-cell base station can act as a means of extending a mobile network and increasing a network capacity, and is also an effective solution for converging a fixed network and a mobile network.

The small-cell base station in this embodiment may be any one of the following:

a femto base station, a pico base station, an ePico base station, and a micro base station.

The femto base station, also referred to as a femtocell, is a type of subminiature mobile base station developed according to 3G development and the mobile broadband trend in recent years. The femtocell uses the IP protocol, and is connected by using an existing home broadband circuit of the user, and implements connectivity from an IP network to a mobile network at a far end by using a dedicated gateway. It is similar to a home modem in size, and has features of easy installation, automatic configuration, automatic network planning, and plug-and-play.

The pico base station, also referred to as a picocell, communicates with an RNC (Radio Network Controller) via a standard Iub interface, and can provide a terminal with standard 3G services such as voice, video and, high-speed data. The picocell is small in size, light in weight, and easy to carry, supports multiple installation manners such as mounting on a wall, hanging, and placing on a desktop, supports all-IP transmission, and effectively uses an IP transmission network to achieve low-cost and fast network construction. The pico base station can share planning, PNC, and a network management platform with a macro base station, be seamlessly integrated into an existing network, and improve overall network performance and user experience.

The ePico base station and the pico base station are the same in aspects of physical form and specifications, and are different only in network architecture. The ePico base station supports a flat network architecture without a controller, and the pico base station supports a conventional network architecture.

The micro base station, also referred to as a microcell, is a small-cell base station developed based on a macro-cell base station, and has low transmit power and a small coverage radius. The micro base station can eliminate blind spots of macro-cell coverage to improve a coverage rate, and can also improve a network capacity, and form a multi-layer network with the macro cell.

In this embodiment, the small-cell base station is connected to an IPTV set-top box, or the small-cell base station may also be integrated into an IPTV set-top box. The terminal obtains an IPTV program list sent by an IPTV content network operator, and the terminal can freely select a streaming media program to watch, and send the request message to the small-cell base station, where the request message carries the stream identifier corresponding to the streaming media program that requested by the terminal.

Step 202: The small-cell base station obtains the stream identifier corresponding to the IPTV program that requested by the terminal.

Step 203: The small-cell base station forwards the request message to the IPTV content network by using an IP bearer network.

The IP bearer network refers to the home broadband access network installed by the user, for example, digital subscriber line XDSL, wired cable or optical fiber.

Step 204: The small-cell base station establishes an air interface broadcast physical channel, and maps the air interface broadcast physical channel to the stream identifier.

The air interface broadcast physical channel is mapped to the stream identifier, so that the small-cell base station distinguishes the streaming media program that requested by the terminal by using the stream identifier at the air interface; only after the air interface broadcast physical channel is mapped to the stream identifier, the small-cell base station can associate the channel with the streaming media program, and send a received streaming media program data packet to the terminal on the channel according to the air interface broadcast physical channel corresponding to program streaming.

Step 205: The small-cell base station receives an IPTV program data packet sent by the IPTV content network by using the IP bearer network.

Step 206: The small-cell base station converts the IPTV program data packet sent by the IPTV content network into a multicast packet.

The small-cell base station processes the IPTV program data packet according to a protocol corresponding to a standard of the terminal, and converts the IPTV program data packet into a multicast packet.

In this embodiment, the standard of the terminal may be any one of the following:

Universal Mobile Telecommunications System UMTS, Global System for Mobile Communications GSM, general packet radio service GPRS, 3GPP Long Term Evolution LTE, Worldwide Interoperability for Microwave Access WiMAX, Code Division Multiple Access CDMA, and Time Division-Synchronization Code Division Multiple Access TD-SCDMA.

The protocol corresponding to the standard of the terminal may be any one of the following:

Broadcast Multicast Service BCMCS, Multimedia Broadcast Multicast Service MBMS, Evolved Multimedia Broadcast Multicast Service eMBMS, and Multicast Broadcast Service MBS.

When the standard of the terminal is GSM, UMTS, GPRS, or TDSCDMA, the small-cell base station converts the IPTV program data packet sent by the IPTV content network according to the MBMS protocol.

When the standard of the terminal is LTE, the small-cell base station converts the IPTV program data packet sent by the IPTV content network according to the eMBMS protocol.

When the standard of the terminal is WiMAX, the small-cell base station converts the IPTV program data packet sent by the IPTV content network according to the MBS protocol.

When the standard of the terminal is CDMA, the small-cell base station converts the IPTV program data packet sent by the IPTV content network according to the BCMCS protocol.

Step 207: The small-cell base station sends the multicast packet to the terminal on the air interface broadcast physical channel.

The small-cell base station sends the multicast packet, which is obtained after the IPTV program data packet sent by the IPTV content network is converted, to the terminal on the air interface broadcast physical channel, which is established in step 204 and is mapped to the IPTV program.

Compared with the prior art, by adopting the technical solution provided by this embodiment, multiple streaming media programs can be watched on a terminal, a same program can be watched on multiple terminals at the same time, and a terminal can dynamically set and freely swap programs to watch, which saves communication resources, improves spectrum utilization, and provides more personalized service for users.

Figure 3:
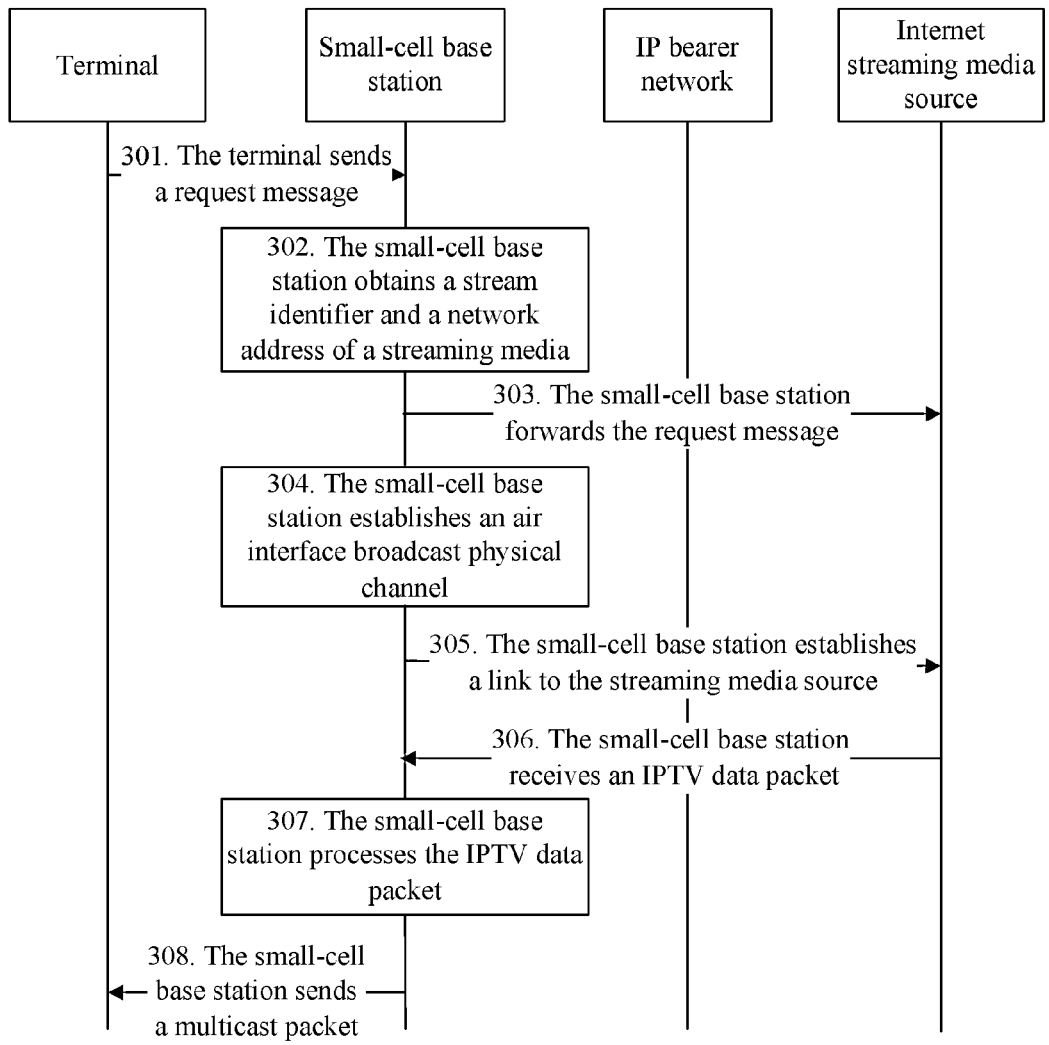
FIG. 3 is a flowchart of a method for implementing mobile streaming media according to an embodiment of the present invention.

As shown in FIG. 3, a third embodiment provides a method for implementing mobile streaming media, and the method mainly includes the following steps:

Step 301: A small-cell base station receives a request message sent by a terminal, the request message carries a network address of an Internet streaming media program that the terminal wants to watch and a stream identifier corresponding to the Internet streaming media program.

In this embodiment, the small-cell base station is connected to a home broadband network, and the terminal obtains an Internet streaming media program list sent by an Internet streaming media source, for example, a video website, an audio website, or a P2P (Peer-to-Peer) streaming media website. The terminal can freely select a streaming media program to watch, and send the request message to the small-cell base station, where the request message carries the network address of the Internet streaming media program that requested by the terminal and the stream identifier corresponding to the Internet streaming media program.

The small-cell base station in this embodiment may be any one of the following:

a femto base station, a pico base station, an ePico base station, and a micro base station.

Step 302: The small-cell base station obtains the network address of the Internet streaming media program that requested by the terminal and the stream identifier corresponding to the Internet streaming media program.

Step 303: The small-cell base station forwards the request message to the Internet streaming media source by using an IP bearer network.

The IP bearer network refers to the home broadband access network installed by the user, for example, digital subscriber line XDSL, wired cable or optical fiber.

Step 304: The small-cell base station establishes an air interface broadcast physical channel, and maps the air interface broadcast physical channel to the stream identifier.

The air interface broadcast physical channel is mapped to the stream identifier, so that the small-cell base station distinguishes the streaming media program that requested by the terminal by using the stream identifier at the air interface, and only after the air interface broadcast physical channel is mapped to the stream identifier, the small-cell base station can associate the channel with the streaming media program, and send a received streaming media program data packet to the terminal on the channel according to the air interface broadcast physical channel corresponding to program streaming.

Step 305: The small-cell base station establishes, according to the network address of the Internet streaming media program carried in the request message sent by the terminal, a link with the Internet streaming media source, for example, the video website, audio website, or P2P streaming media website.

Step 306. The small-cell base station receives the streaming media program data packet sent by the Internet streaming media source by using the IP bearer network.

Step 307: The small-cell base station converts the streaming media program data packet sent by the Internet streaming media source into a multicast packet.

The small-cell base station processes the streaming media program data packet according to a protocol corresponding to a standard of the terminal, and converts the streaming media program data packet into a multicast packet.

In this embodiment, the terminal standard may be any one of the following:

Universal Mobile Telecommunications System UMTS, Global System for Mobile Communications GSM, general packet radio service GPRS, 3GPP Long Term Evolution LTE, Wireless Local Area Network WiMAX, Code Division Multiple Access CDMA, and Time Division-Synchronization Code Division Multiple Access TD-SCDMA.

The protocol corresponding to the standard of the terminal may be any one of the following:

Broadcast Multicast Service BCMCS, Multimedia Broadcast Multicast Service MBMS, Evolved Multimedia Broadcast Multicast Service eMBMS, and Multicast Broadcast Service MBS.

When the standard of the terminal is GSM, UMTS, GPRS, or TDSCDMA, the small-cell base station converts the Internet streaming media program data packet sent by the Internet streaming media source according to the MBMS protocol.

When the standard of the terminal is LTE, the small-cell base station converts the Internet streaming media program data packet sent by the Internet streaming media source according to the eMBMS protocol.

When the standard of the terminal is WiMAX, the small-cell base station converts the Internet streaming media program data packet sent by the Internet streaming media source according to the MBS protocol.

When the standard of the terminal is CDMA, the small-cell base station converts the Internet streaming media program data packet sent by the Internet streaming media source according to the BCMCS protocol.

Step 308: The small-cell base station sends the multicast packet to the terminal on the air interface broadcast physical channel.

The small-cell base station sends the multicast packet, which is obtained after the streaming media program data packet sent by the Internet streaming media source is converted, to the terminal on the air interface broadcast physical channel, which is established in step 304 and is mapped to the Internet streaming media program.

Compared with the prior art, by adopting the technical solution provided by the embodiment, multiple streaming media programs can be watched on a terminal, a same program can be watched on multiple terminals at the same time, and a terminal can dynamically set and freely swap programs to watch, which saves communication resources, improves spectrum utilization, and provides more personalized service for users.

Figure 4:
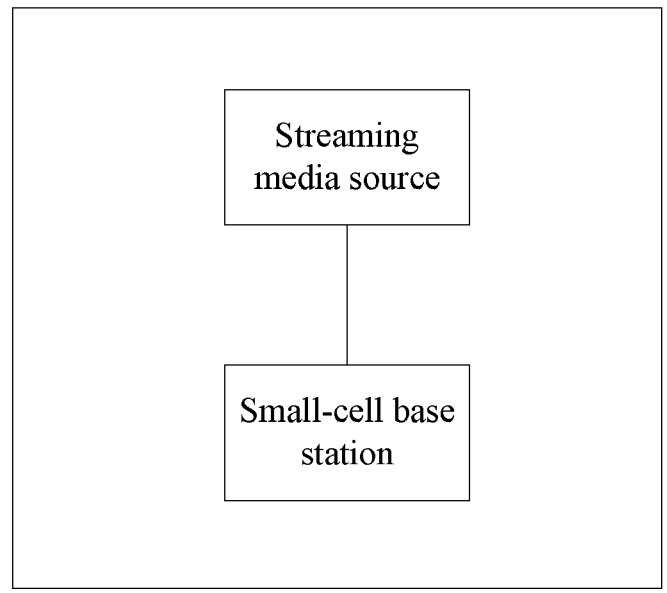
FIG. 4 is a structural diagram of a system for implementing mobile streaming media according to an embodiment of the present invention.

As shown in FIG. 4, a fourth embodiment provides a system for implementing mobile streaming media, including a small-cell base station and a streaming media source, where, the streaming media source is configured to send a streaming media data packet to the small-cell base station; and the small-cell base station is configured to receive a request message sent by a terminal, where the request message carries a stream identifier corresponding to a streaming media program, and forward the request message to the streaming media source; establish an air interface broadcast physical channel, and map the air interface broadcast physical channel to the stream identifier; receive the streaming media data packet sent by the streaming media source, and convert the streaming media data packet into a multicast packet; and send the multicast packet to the terminal on the air interface broadcast physical channel.

Further, in the system for implementing mobile streaming media provided by this embodiment, when the streaming media source is an Internet video website, an audio website, or a P2P streaming media source, the small-cell base station further includes a link establishing unit, configured to establish a link with the Internet video website, the audio website, or the P2P streaming media source according to a network address, carried in the request message sent by the terminal, of a streaming media program that the terminal wants to watch.

Figure 5:
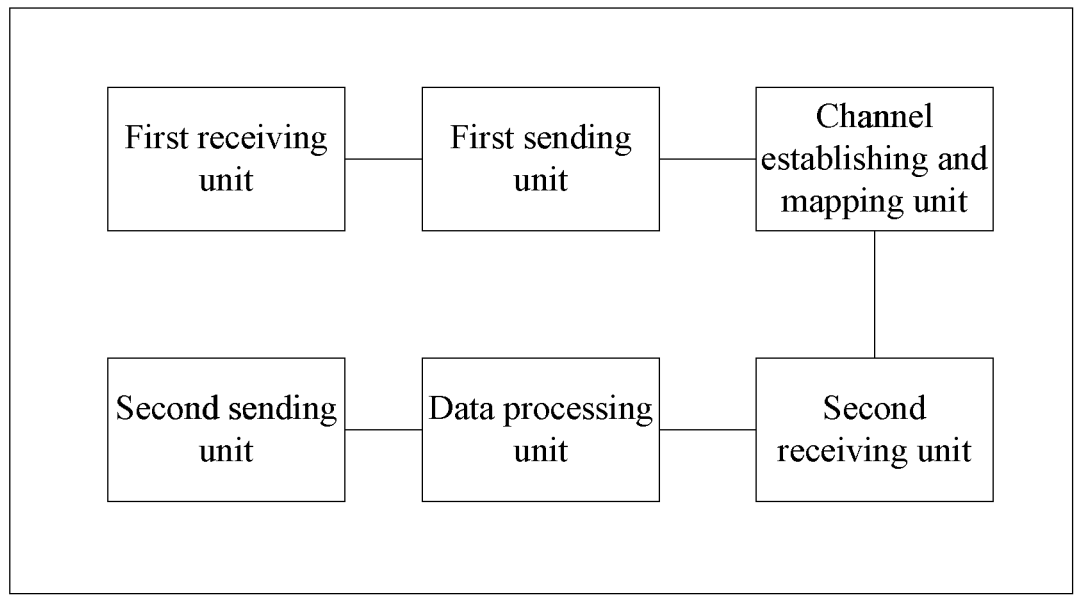
FIG. 5 is a structural diagram of a small-cell base station according to an embodiment of the present invention.

As shown in FIG. 5, a fifth embodiment provides a small-cell base station, including:

a first receiving unit, configured to receive a request message sent by a terminal, where the request message carries a stream identifier corresponding to a streaming media program;

a first sending unit, configured to forward the request message sent by the terminal to a streaming media source;

a channel establishing and mapping unit, configured to establish an air interface broadcast physical channel, and map the air interface broadcast physical channel to the stream identifier;

a second receiving unit, configured to receive a streaming media data packet sent by the streaming media source;

a data processing unit, configured to convert the streaming media data packet into a multicast packet; and a second sending unit, configured to send the multicast packet to the terminal on the air interface broadcast physical channel.

Figure 6:
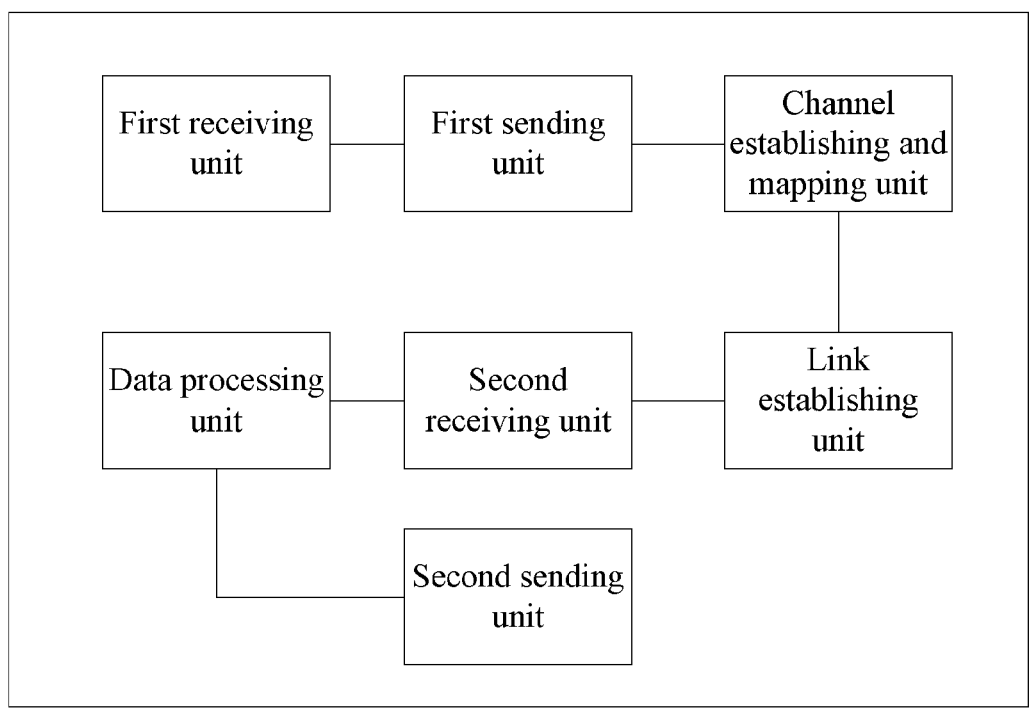
FIG. 6 is a structural diagram of a small-cell base station according to an embodiment of the present invention.

As shown in FIG. 6, a sixth embodiment provides a small-cell base station, including:

a first receiving unit, configured to receive a request message sent by a terminal, where the request message carries a network address of streaming media that requested by the terminal and a stream identifier corresponding to the streaming media;

a first sending unit, configured to forward the request message sent by the terminal to a streaming media source;

a channel establishing and mapping unit, configured to establish an air interface broadcast physical channel, and map the air interface broadcast physical channel to the stream identifier;

a link establishing unit, configured to establish a link with the streaming media source according to the network address of the streaming media program carried in the request message sent by the terminal;

a second receiving unit, configured to receive a streaming media data packet sent by the streaming media source;

a data processing unit, configured to convert the streaming media data packet into a multicast packet; and a second sending unit, configured to send the multicast packet to the terminal on the air interface broadcast physical channel.

It can be clearly understood by persons skilled in the art that, for the purpose of convenient and brief description, for detailed working processes of the foregoing systems, apparatuses, and units, reference may be made to corresponding processes in the foregoing method embodiments, and details are not described herein again.

In the several embodiments provided by the present invention, it should be understood that the disclosed system, apparatus, and method may be implemented in other manners. For example, the described apparatus embodiment is merely exemplary. For example, the division of units is merely a division of logical functions and there may be other division manners in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may be or not be physically separate, and parts displayed as units may be or not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions to enable a computer device (which may be a personal computer, a server, or a network device) to perform all or a part of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing are merely preferred implementation manners of the present invention for persons skilled in the art to understand or implement the present invention. Varied modifications of the embodiments are obvious for persons skilled in the art, and the general principle defined in the specification may be implemented in other embodiments without departing from the spirit and scope of the present invention. Therefore, the present invention will not be limited to the embodiments shown in the specification, but should comply with the widest range consistent with the principles and novel features disclosed in the specification.

What is claimed is:

1. A method for implementing mobile streaming media, comprising:

receiving, by a small-cell base station, a request message sent by a terminal, wherein the request message carries a stream identifier corresponding to a streaming media program, and forwarding, by the small-cell base station, the request message to a streaming media source;

in response to the request message received by the small-cell base station, establishing, by the small-cell base station, an air interface broadcast physical channel to the terminal, and mapping the air interface broadcast physical channel to the stream identifier;

establishing, by the small-cell base station, a link with the Internet streaming media source according to the network address carried in the request message sent by the terminal;

receiving, by the small-cell base station, a streaming media data packet sent by the streaming media source, and converting the streaming media data packet into a multicast packet; and sending, by the small-cell base station, the multicast packet to the terminal on the air interface broadcast physical channel.

2. The method according to claim 1, wherein the small-cell base station is any one of the following:

a femto base station, a pico base station, an ePico base station, and a micro base station.

3. The method according to claim 2, wherein the request message is forwarded by the small-cell base station to the streaming media source by using an IP bearer network, and the streaming media data packet is sent by the streaming media source to the small-cell base station by using the IP bearer network.

4. The method according to claim 3, wherein the IP bearer network is a home broadband access network.

5. The method according to claim 4, wherein the streaming media source is an Internet Protocol television IPTV content network or an Internet streaming media source.

6. The method according to claim 5, wherein the Internet streaming media source is any one of the following: a video website, an audio website, and a P2P streaming media website.

7. The method according to claim 6, wherein, when the streaming media source is the Internet streaming media source, the request message sent by the terminal further carries a network address of the streaming media program.

8. A system for implementing mobile streaming media, comprising a small-cell base station and a streaming media source, wherein:

the streaming media source is configured to send a streaming media data packet to the small-cell base station; and the small-cell base station is configured to:
  receive a request message sent by a terminal, wherein the request message carries a stream identifier corresponding to a streaming media program,
  forward the request message to the streaming media source,
  in response to the received request message sent by the terminal, establish an air interface broadcast physical channel to the terminal, map the air interface broadcast physical channel to the stream identifier, receive the streaming media data packet sent by the streaming media source, convert the streaming media data packet into a multicast packet, and send the multicast packet to the terminal on the air interface broadcast physical channel; and establish a link with the streaming media source according to a network address of the streaming media program carried in the request message sent by the terminal.

9. A small-cell base station, comprising:

non-transitory computer readable storage medium to store a program; and computer hardware configured, including configured by the program, to implement:
- a first receiving unit, configured to receive a request message sent by a terminal, wherein the request message carries a stream identifier corresponding to a streaming media program;
- a first sending unit, configured to forward the request message sent by the terminal to a streaming media source;
- a channel establishing and mapping unit, configured to, in response to the received request message sent by the terminal, establish an air interface broadcast physical channel to the terminal, and map the air interface broadcast physical channel to the stream identifier;
- a second receiving unit, configured to receive a streaming media data packet sent by the streaming media source;
- a data processing unit, configured to convert the streaming media data packet into a multicast packet;
- a second sending unit, configured to send the multicast packet to the terminal on the air interface broadcast physical channel; and
- a link establishing unit, configured to establish a link with an Internet streaming media source as the streaming media source according to a network address of the streaming media program carried in the request message sent by the terminal.

10. The small-cell base station according to claim 9, wherein the small-cell base station is any one of the following:

a femto base station, a pico base station, an ePico base station, and a micro base station.

* * * * *